UNITED STATES PATENT OFFICE.

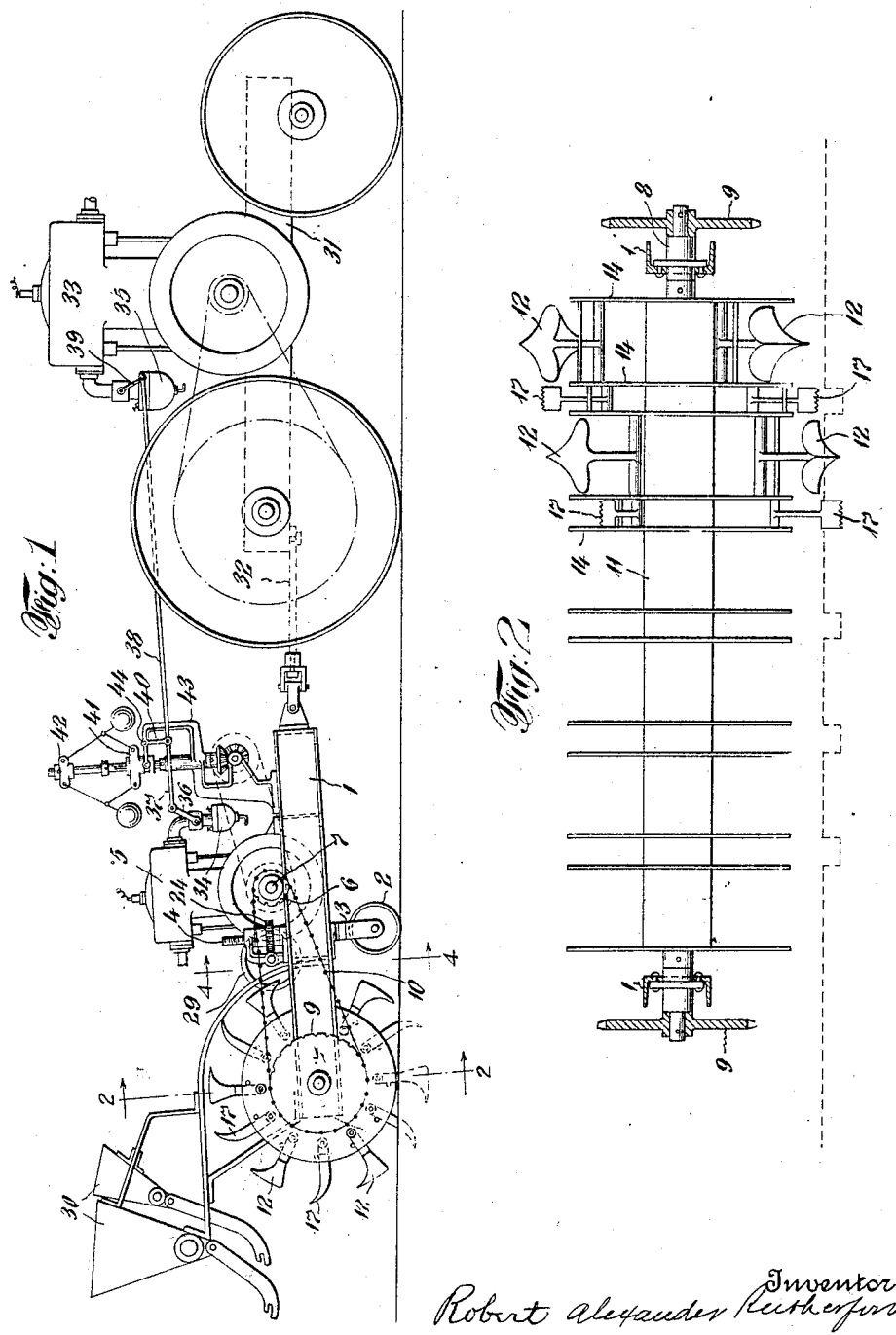

ROBERT ALEXANDER RUTHERFURD, OF NEW YORK, N. Y.

SOIL-CULTIVATOR.

1,377,602. Specification of Letters Patent. Patented May 10, 1921.

Application filed April 11, 1918. Serial No. 227,951.

*To all whom it may concern:*

Be it known that I, ROBERT ALEXANDER RUTHERFURD, a citizen of the United States, residing in the city of New York, county of New York, borough of Manhattan, and State of New York, have invented certain new and useful Improvements in Soil-Cultivators, of which the following is a full, clear, and exact specification.

My invention relates to soil cultivators and refers particularly to those of a rotary character.

One object of my invention is a device whereby soil may be plowed, sub-soiled and planted in one operation.

Another object of my invention is a rotary soil cultivating device which will cultivate soil of varying hardness.

Another object of my invention is a rotary soil cultivating device which will not be affected by ordinary stones and impediments generally found in cultivatable soils.

Another object of my invention is a rotary soil cultivator which will maintain a uniform speed of travel.

These and other objects of my invention will be evident upon a consideration of my specification and drawings.

Considerable difficulty has been experienced in producing an operative rotary soil cultivator, due to the varying conditions of soil and the particular operation of these devices upon the soil.

The amount of soil that each plow share of a rotary plow will sucessfully turn over is naturally limited, as it must operate upon such an amount that it can readily separate it from the unplowed portion without undue strain upon the mechanism. It is evident that if the cultivator moves more rapidly than is advantageous, the share will not be able to dislodge the earth, as each portion attacked by the share will be too great for it to manipulate. On the other hand, if the cultivator moves too slowly, it will not work to its soil capacity and hence will be slow in operation and uneconomical.

It is further evident that rigid shares will be readily broken if they strike an unyielding substance such as a stone.

A cultivator of this class must be strong in construction, light in weight, easily handled, capable of a large amount of work, adaptable to all sorts of soil, automatically controlled to a uniform speed and easy of operation.

My device accomplishes all of these, and other, desirable objects.

In order that my device may be more than simply a plow, I have combined with it a sub-soiler and seeders so that all three of these necessary operations may be accomplished by one passage over the ground.

In order to overcome the difficulty of irregular movement of the cultivator, with the consequent inefficient or absolute lack of working of the soil, I have automatically controlled the speed of movement so that an equal quantity of soil will always be handled by the plow-shares and sub-soilers irrespective of the character of the soil, the movement of the cultivator being uniform no matter how much the work demanded of my device may vary.

My device is light and strong in construction and is designed to be drawn by any suitable tractor.

In the drawings accompanying this specification illustrating one form of a device of my invention, similar parts are designated by similar numerals:—

Figure 1 is a side plan view, partly diagrammatic, showing one form of my invention.

Fig. 2 is a section through the line 2—2 of Fig. 1, with parts removed for clearness of description.

The particular form of my device, illustrated in the accompanying drawings, comprises a frame 1, 1 carried by the wheels 2, 2 revoluble within the brackets 3, 3, the brackets 3, 3 being revoluble around the supporting bars 4, 4. The frame 1, 1 carries the motive power necessary to revolve the plow mechanism, the seeders and all other parts necessary for the proper operation of my device.

Mounted upon the frame 1, 1 is an internal combustion engine 5, carrying sprocket wheels 6, 6 fixedly attached to the main revoluble shaft 7. Revolubly attached to the frame 1, 1 is the shaft 8 carrying the sprocket wheels 9, 9 in alinement with the wheel 6 and connected therewith by the chain belts 10, 10.

A cylindrical member 11, fixedly attached to the shaft 8, carries a series of plow-shares 12, 12. In the device shown, these are arranged in series of threes around the cylinder 11, each series being staggered with respect to the next.

Intermediate of the several series of plowshares are series of sub-soilers 17, 17, in series of three each, the several series being staggered with respect to each other. Each sub-soiler 17 is pivotally attached to the cylinder 11.

The frame 1, 1 carries seeders 30, 30 which may be of any desired construction.

The frame 1, 1 can be attached to a tractor 31 by means of the connecting bar 32. The tractor 31 carries an internal combustion engine 33 which is a source of motive power for the tractor. The carbureter 34 of the engine 5 and the carbureter 35 of the engine 33 are connected by the link system 36, 37, 38, 39, the link 36 governing the carbureter 34 and the link 39 governing the carbureter 35. An angular member 40 connects the links 37 and 38 with the collar 41 of the governor 42, the member 40 being pivoted to the bracket 43 at 44.

The operation of this speed governing mechanism is as follows:—

The carbureters 34 and 35 are set so that the tractor 31 will have the proper forward movement for the production of proper results. If the cultivator moves too slowly, the governor collar 41 will drop, revolving the member 40, pushing the rod 38 forward, opening the carbureter 35 and increasing the speed of the tractor 31 until the proper speed is again obtained. If the speed of the cultivator is increased, the collar 41 will rise, moving the rod 48 rearwardly, decreasing the speed of the tractor until the movement is normal. The speed of movement of the tractor will act in the same manner upon the speed of movement of the cultivator. In this manner the cultivator and tractor act as controls for the normal desired movement of the device.

I do not limit myself to the particular size, shape, number or arrangements of parts as described and shown, all of which may be varied without going beyond the scope of my invention as shown, described and claimed.

What I claim is:—

1. In a soil-cultivator, in combination, a trailer, revoluble soil-cutters carried by the trailer, means for revolving the soil-cutters, a tractor attached to the trailer, means for moving the tractor and means whereby the speed of the movement of the tractor is governed by the speed of revolution of the revoluble soil-cutters of the trailer.

2. In a soil-cultivator, in combination, a trailer, revoluble soil-cutters carried by the trailer, means for revolving the soil-cutters, a tractor attached to the trailer, an internal combustion engine for moving the tractor and means whereby the speed of the internal combustion engine is governed by the speed of revolution of the revoluble soil-cutters of the trailer.

3. In a soil-cultivator, in combination, a trailer comprising a frame and wheels upon which it can be moved, a revoluble member carried by the trailer, means for revolving the revoluble member, a series of outwardly extended soil-cutters carried by the revoluble member, a tractor attached to the trailer, an internal combustion engine for moving the tractor and means whereby the speed of movement of the internal combustion engine is governed by the speed of revolution of the revoluble member of the trailer.

4. In a soil-cultivator, in combination, a trailer comprising a frame and wheels upon which it can be moved, a revoluble member carried by the trailer, means for revolving the revoluble member, a series of outwardly extended soil-cutters carried by the revoluble member, a tractor attached to the trailer, an internal combustion engine for moving the tractor and means whereby the speed of revolution of the revoluble member of the trailer and the speed of the internal combustion engine act together to maintain a uniform revoluble movement of the revoluble member of the trailer.

5. In a soil-cultivator, in combination, a trailer comprising a frame and wheels upon which it can be moved, a revoluble member carried by the trailer, means for revolving the revoluble member, a series of outwardly extended soil-cutters carried by the revoluble member, a tractor attached to the trailer, an internal combustion engine for moving the tractor and means whereby the speed of movement of the internal combustion engine is governed by the speed of revolution of the revoluble member of the trailer.

6. In a soil-cultivator, in combination, a trailer comprising a frame and wheels upon which it can be moved, a revoluble member carried by the trailer, means for revolving the revoluble member, a series of outwardly extended soil-cutters carried by the revoluble member, a tractor attached to the trailer, an internal combustion engine for moving the tractor and means whereby the speed of revolution of the revoluble member of the trailer and the speed of the internal combustion engine act together to maintain a uniform revoluble movement of the revoluble member of the trailer.

7. In a soil-cultivator, in combination, a trailer, revoluble soil-cutters carried by the trailer, an internal combustion engine for revolving the soil-cutters, a tractor attached to the trailer, an internal combustion engine for moving the tractor and means whereby the amount of combustible material fed to the tractor engine will be governed by the speed of the trailer.

8. In a soil-cultivator, in combination, a trailer, revoluble soil-cutters carried by the trailer, an internal combustion engine for revolving the soil-cutters, a tractor attached to the trailer, an internal combustion engine for moving the tractor and means whereby the amounts of combustible material fed to the two engines act together to maintain a uniform revoluble movement to the soil-cutters.

Signed at New York, in the county of New York and State of New York this 17th day of June, 1920.

ROBERT ALEXANDER RUTHERFURD.